July 14, 1931.  J. L. BENNETT  1,814,784
UTENSIL
Filed May 1, 1928  2 Sheets-Sheet 1
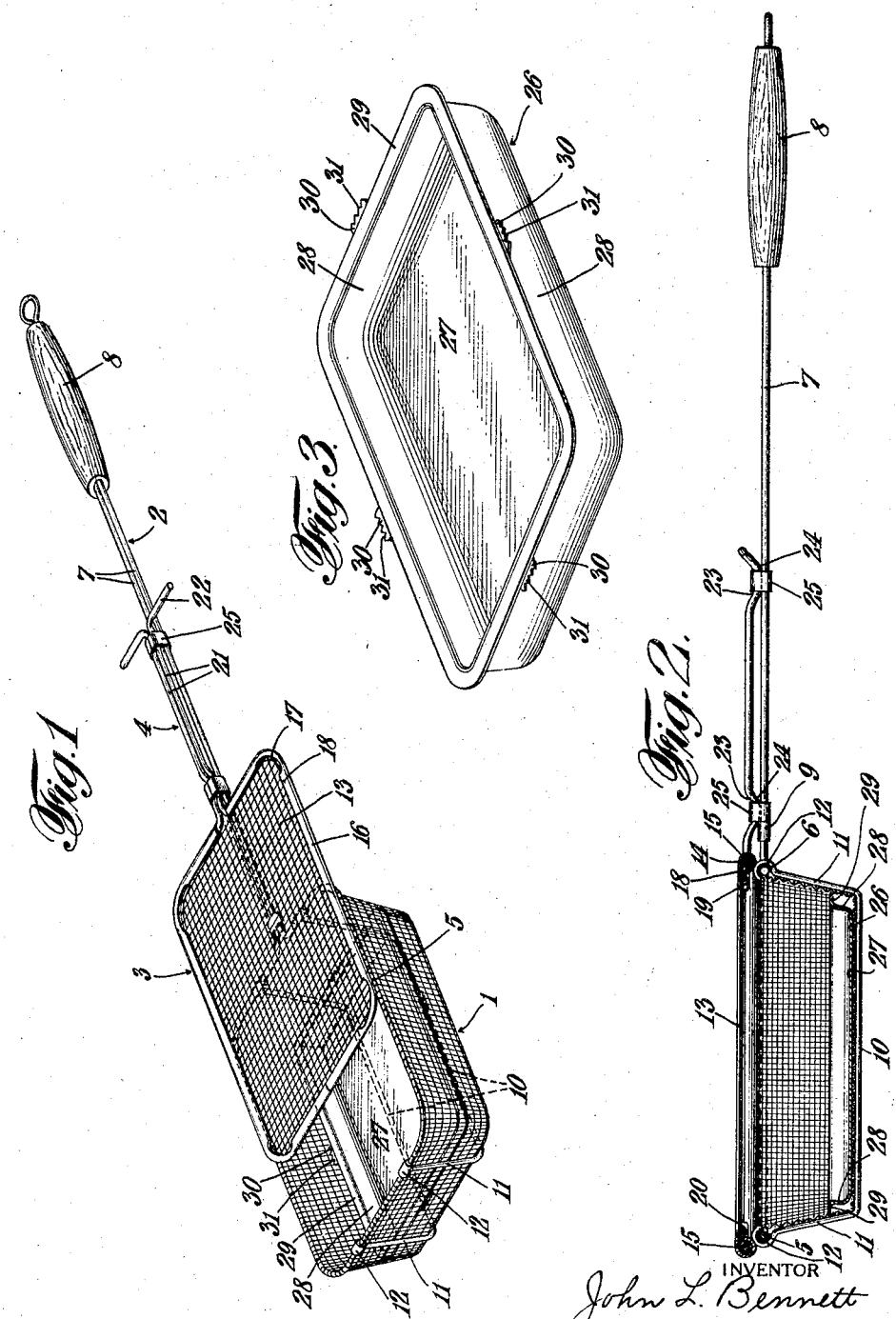

July 14, 1931. J. L. BENNETT 1,814,784
UTENSIL
Filed May 1, 1928 2 Sheets-Sheet 2
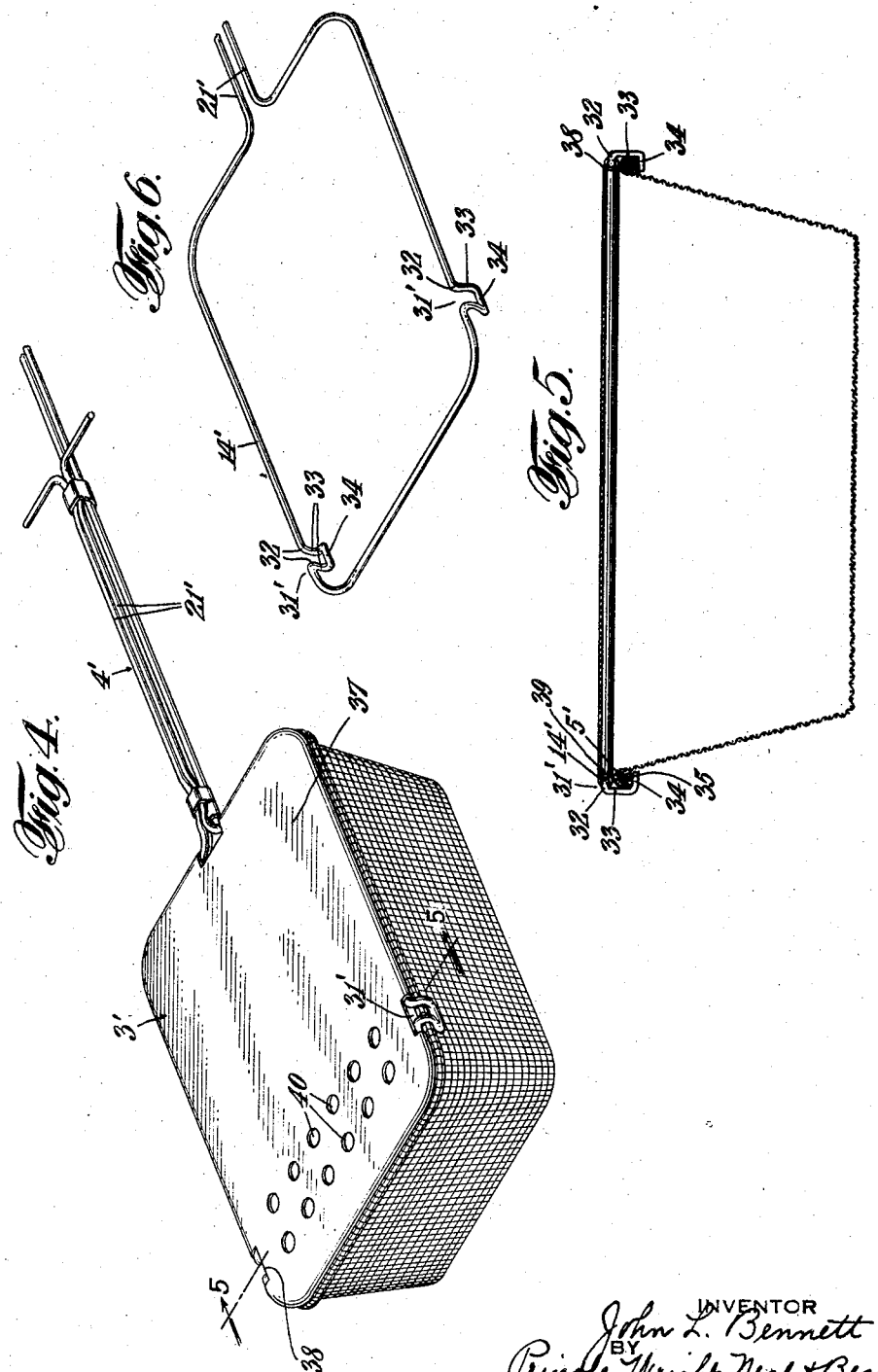
INVENTOR
John L. Bennett
BY
Prindle, Wright, Neal & Bean
ATTORNEYS

UNITED STATES PATENT OFFICE

JOHN L. BENNETT, OF DECATUR, ILLINOIS, ASSIGNOR TO U. S. MANUFACTURING CORPORATION, OF DECATUR, ILLINOIS, A CORPORATION OF ILLINOIS

UTENSIL

Application filed May 1, 1928. Serial No. 274,184.

This invention relates to improvements in a utensil designed primarily for use as a corn popper and deep fat frying utensil but having numerous other uses in connection with the kitchen or culinary work.

The principal object of this invention is the provision of a device which is simple and strong in construction, attractive in appearance, efficient in operation and which may be made cheaply on a production basis and, therefore, sold cheaply to the consuming public.

A further object of this invention is the provision of such a device in which the cover is slidable along the body of the structure and when in position is securely held down against the top of the basket or receptacle forming the main part of the device, so that the contents of the basket or receptacle are securely held therein until it is desired to discharge the same when the cover is moved to open position.

A further object of this invention is the use of a solid bottom member which is insertable and removable at will, whereby when used as a corn popper, seasoning and flavoring substances such as butter, salt and the like, may be placed in the device during the corn popping operation and the complete treatment of the corn accomplished with a minimum amount of trouble and whereby the bottom member may be readily removed for cleaning and also to permit the device to be used as an ordinary corn popper or frying apparatus.

Further objects of this invention include improvements in details of construction and operation hereinafter described.

To the accomplishment of the foregoing and such other objects as may hereinafter appear, this invention consists in the construction, combination and arrangement of parts hereinafter described and then sought to be defined in the appended claims, reference being had to the accompanying drawings forming a part hereof and which show, merely for the purpose of illustrative disclosure, several embodiments of my invention, it being expressly understood, however, that various changes may be made in practice within the scope of the claims without digressing from my inventive idea.

In the drawings—

Figure 1 represents a perspective view of a device constructed to embody my invention, the lid or cover being shown in a partially open position and the bottom member being shown in place.

Figure 2 is a vertical longitudinal cross section through the apparatus shown in Figure 1, the lid or cover being shown closed.

Figure 3 is a perspective view of the bottom member removed from the basket or receptacle.

Figure 4 is a perspective view of another form of lid or cover for this device.

Figure 5 is a transverse cross section through the basket or receptacle and a lid or cover shown in Figure 4.

Figure 6 is a perspective view of part of the wire frame for the lid or cover.

Referring now to the drawings, the numeral 1 designates the basket or receptacle of the device, which is provided with a handle designated generally as 2 and having the lid or cover 3 slidably mounted thereon, this lid or cover 3 also having a handle portion 4 slidable upon the main handle 2.

Now describing these parts more in detail, the basket or receptacle is formed of a suitable wire netting or reticulated material pressed into a desired shape and supported upon a looped wire supporting member 5 by turning and pressing the edges of the material forming the basket or receptacle therearound, as shown at 6 in Figure 2. This looped wire supporting member is preferably formed as an extension of the handle member 2, which is composed of a pair of wires or rods 7 extending in parallel relation to each other for a considerable distance and having a gripping element 8 secured thereto. The ends of these wires 7 are held together by the gripping element 8 and said wires are also held together at the beginning of the loop 5 by means of a clamping element 9. In order to protect the material of which the basket or receptacle is formed and also to permit an easy sliding movement of the same upon any surface, I provide a plurality of bracing wires or runners 10 which extend longitudinally along the bottom of the basket or receptacle and along the front and rear ends of the same at 11 and being bent over and secured to the loop and the bent material of the basket or receptacle as at 12. The lid or cover 3 is also formed of a suitable woven or reticulate material 13 which is secured to the loop holding member 14, which is in the form of a loop of wire preferably constituting an extension of the handle 4 therefor. The material is secured to the loop 14 by being bent and pressed therearound as at 15 and also by having the metallic binding 16 positioned at the edges thereof and also bent and clamped to the combined wire-supporting element and the reticulate material of the lid or cover. This metallic binding is preferably made in two parts and shaped to conform to the shape of the lid or cover, which, of course, conforms to the shape of the opening into the basket or receptacle 1. It has the corners cut out as at 17, leaving an upper flange 18 and a lower flange 19. The lower flanges are pressed around the wire-supporting loop element so as to fit tightly against the under side of the material of the lid or cover and forming the undercut portion or shoulder 20. The upper flange 18 remains substantially flat.

As stated above, the supporting loop 14 is an extension of the handle 4 of the lid or cover, this handle being formed by the parallel wire portions 21 which extend along the top of the main handle 2 and have their extremities bent laterally as at 22 to provide manipulating means. These parallel wires 21 are bent or indented as at 23 so as to form bearing loops 24 adapted to bear and slide upon the wires 7 of the main handle 2. Slidable clamping means 25 are provided which are seated in the indentations and slidably engage the wires 7 of the main handle 2, this clamping means being located one near the free end of the handle 4 and the other near the beginning of the supporting loop 14. The forward clamping member 25 is adapted to engage the clamp member 9 on the main handle 2 when the lid or cover is in the extreme closed position, these parts forming a stop construction so as to limit the closing movement of the lid or cover and insure that it is properly positioned on the basket or receptacle. The laterally turned manipulating means 22 is adapted to contact with the front end of the gripping member 8 when the lid or cover is in its extreme open position, and therefore affording a stop construction to limit the opening movement of the lid or cover.

It is to be especially noticed that in forming the indentations 23 in the handle 4 of the lid or cover and more particularly the indentation which is closest to the supporting loop 14 thereof, that the wires are bent in such a way as to cause the supporting loop 14 and the attached lid or cover material to have a frictional bearing and contact with the upper edges of the basket or receptacle, whereby in the closing and opening movements of the lid or cover it slides along the top of the basket or receptacle, and when closed will be held tightly against the top edge of the basket or receptacle, preventing the accidental discharge or loss of material in the basket or receptacle. Furthermore, by pressing the lower flanges 19 of the binding material for the lid or cover and forming the undercut or shoulder portions 20, the lid or cover, due to the fact that it is slightly larger than the top edge of the basket or receptacle and, therefore, overlaps the same, will have a tight fit upon the top edges of the receptacle afforded by the supporting loop 5, which results in additional security when the lid or cover is closed. These features are very important in providing a device which may be efficiently operated under all conditions.

The construction just described may be used as an ordinary corn popper or utensil for deep fat frying. In addition, I provide the attachment or accessory shown in Figure 3, which permits this device to be used with seasoning therein. This accessory is in the form of a pan 26, which is shaped to correspond to the bottom portion of the inside of the basket or receptacle so as to fit therein and rest upon the bottom thereof, being provided with a solid bottom 27, solid sides 28 and the solid top rim 29 extending laterally therefrom. In order to hold this accessory in position I provide a plurality of laterally extending lugs 30 which are provided with one or more teeth 31 of a proper size to fit between the interstices of the material of which the basket or receptacle is formed, as clearly shown in Figure 1 of the drawings. It is, therefore, seen that I have provided an accessory which may be readily inserted and will be securely held in proper position for use and which also may be readily removed for cleaning or when its use is not desired. By the use of such a device the corn popper as a whole has all the advantages of an all-metal or solid construction device and at the same time is very much lighter in weight and, therefore, easier to handle. In addition, it enables the corn popping operation to be visible at all times, which is one of the attractions of the use of these devices in the home.

The making of this accessory is a deep drawing press operation so that the pan will be without seams and in its entirety will be stamped out of a single piece of material.

Referring now to Figures 4 and 5 of the drawings, in which is illustrated a modification of the lid or cover construction, the same reference characters are used for the same parts, the lid or cover being designated generally by the reference character 2' and the handle therefor being designated generally by the reference character 4', this handle being formed of the parallel wire parts 21' which are extensions of the loop 14' for the lid or cover. This loop is the same in construction as that previously described with one exception and that is that it is bent in its side portions near its outer end, as at 31', to form a pair of opposed loops, these loops being bent first laterally for a short distance, as at 32, and then downwardly and vertically, as at 33, and then laterally and inwardly, as at 34. The last lateral bend 34 provides a lateral lug which is removed a sufficient distance from the top of the loop 14' and the lid or cover secured thereto so that it will be positioned and fit under the shoulders 35 formed by the supporting loop 5' at the upper edge of the basket or receptacle. The vertical portion 33 constitutes a bearing part adapted to engage and slide along the outside of said shoulders 35 in moving the lid or cover to an open or closed position. In this construction the lid or cover itself is formed of a solid piece of material 37 such as aluminum. It is cut out as at 38 to fit the lugs previously described and has its edges bent around the loop 14' as at 39. This lid or cover may be provided with suitable perforations 40 at its lower end so as to permit the shaking out of the unpopped corn, these perforations, of course, being too small to permit the discharge of the popped corn.

What I claim is:—

1. A device of the character described including, in combination, a basket or receptacle and a handle therefor, a lid or cover for said basket or receptacle formed of a wire frame in the form of a loop having a handle portion extending therefrom and material secured to said loop to serve as a cover, said handle of the lid or cover being slidably mounted upon said first-mentioned handle and having a plurality of bent portions therein adapted to frictionally engage said first-mentioned handle, clamping means positioned in said bent portions to hold said handles in slidable relation to each other.

2. A device of the character described including, in combination, a basket or receptacle and a handle therefor, a lid or cover for said basket or receptacle formed of a wire frame in the form of a loop having a handle portion extending therefrom and material secured to said loop to serve as a cover, said handle of the lid or cover being slidably mounted upon said first-mentioned handle and having a plurality of bent portions therein adapted to frictionally engage said first-mentioned handle, clamping means positioned in said bent portions to hold said handles in slidable relation to each other, and one of said bends so positioning the lid or cover proper that it frictionally engages the top edges of the basket or receptacle during its sliding movement relative thereto and when in closed position.

3. A device of the character described including, in combination, a main frame formed of wire having one end provided with a loop and having handle portions extending therefrom, a body secured to and depending from said loop forming a basket or receptacle, a frame for a lid or cover including a looped portion and handle portions extending therefrom, cover material secured to said loop, said handle portions being slidably connected together, said lid or cover being provided with a plurality of depending lugs bent inwardly so as to fit under the wire loop for the basket or receptacle.

4. A device of the character described including, in combination, a main frame formed of wire having one end provided with a loop and having handle portions extending therefrom, a body secured to and depending from said loop forming a basket or receptacle, a frame for a lid or cover including a looped portion and handle portions extending therefrom, cover material secured to said loop, said handle portions being slidably connected together, the wire of said loop for the lid or cover being bent to provide integral depending lugs having inturned portions to fit under the bead formed by the wire loop for the basket or receptacle, whereby the lid or cover is prevented from moving up and away from the basket or receptacle.

5. A device of the character described including, in combination, a basket or receptacle and a handle therefor, a lid or cover for said basket or receptacle and having a handle slidably mounted upon said first-mentioned handle, means for holding said handles in slidable relation to each other and stop or abutment means on said first mentioned handle to limit the closing movement of said lid or cover, said holding means causing the two handles to frictionally engage each other, and the lid or cover member to frictionally engage the top edges of the basket or receptacle.

6. A device of the character described including, in combination, a basket or receptacle of foraminous material having a handle secured thereto, a pan member shaped to correspond with the bottom of said basket or receptacle and insertable in and removable therefrom, and having means for engaging the foraminous material to hold the pan member in position in said basket or receptacle.

7. A device of the character described including, in combination, a basket or receptacle of foraminous material having a handle secured thereto, a pan member shaped to correspond with the bottom of said basket or receptacle and insertable in and removable therefrom, and having means for engaging the foraminous material to hold the pan member in position in said basket or receptacle, said means including lateral lugs provided with projections adapted to engage the interstices of said foraminous material.

8. A device of the character described including, in combination, a basket or receptacle of foraminous material having a handle secured thereto, a pan member shaped to correspond with the bottom of said basket or receptacle and insertable in and removable therefrom, and having means for engaging the foraminous material to hold the pan member in position in said basket or receptacle, said pan member being of one piece construction.

9. A device of the character described including, in combination, a basket or receptacle of foraminous material having a handle secured thereto, a pan member shaped to correspond with the bottom of said basket or receptacle and insertable in and removable therefrom, said pan member being provided with a lateral flange extending around the upper edge thereof and having a plurality of lateral lugs extending from said flange and adapted to engage said foraminous material.

10. A device of the character described including, in combination, a basket or receptacle having a handle member extending therefrom, a lid or cover comprising wire bent in the form of a loop with a handle member extending therefrom and having cover material secured to said loop, said handles being slidable with relation to each other whereby said lid or cover may be moved to open or closed position, said cover being provided with a plurality of perforations near one end the wire of the loop being bent to form a guiding lug on each side adapted to engage the top side edges of the basket or receptacle and guide the lid or cover relative thereto.

11. A device of the character described including, in combination, a basket or receptacle and a handle therefor, said basket or receptacle having its upper edge provided with a beaded construction, a wire frame for a lid or cover including a loop portion and a handle portion extending therefrom, the wire of said loop being bent to provide integral depending lugs having inturned portions to slidably fit under the beaded edge of the basket or receptacle whereby the lid or cover is prevented from moving up and away from the basket or receptacle.

12. As an article of manufacture, an accessory for corn poppers and the like comprising a pan member shaped to correspond with the bottom of said corn popper and the like and adapted to be inserted in and removed therefrom, said pan member having means for engaging the sides of the body of the corn popper so as to hold the same in position.

13. As an article of manufacture, an accessory for corn poppers and the like comprising a one-piece metallic member drawn or pressed to correspond in shape with the bottom of said corn popper and the like and adapted to be inserted in and removed therefrom, said pan member being provided with means for engaging said corn popper and the like to hold the pan in position therewithin.

14. A device of the character described including, in combination, a basket or receptacle of foraminous material having a handle secured thereto, a shallow pan member shaped to correspond with the bottom of said basket or receptacle and insertible in and removable therefrom, and having means for engaging the foraminous material to hold the pan member in position in said basket or receptacle, said means including lateral lugs provided with projections adapted to engage the interstices of said foraminous material.

15. A device of the character described including, in combination, a basket or receptacle of foraminous material having a handle secured thereto, a shallow pan member shaped to correspond with the bottom of said basket or receptacle, and insertible in and removable therefrom, and having means for engaging the foraminous material to hold the pan member in position in said basket or receptacle, said pan member being of one piece construction.

16. A device of the character described including, in combination, a basket or receptacle having a handle secured thereto, a pan member shaped to correspond with the bottom of said basket or receptacle and insertible in and removable therefrom, and having means for engaging the basket or receptacle to hold the pan member in position in said basket or receptacle, a lid or cover for said basket or receptacle and having a handle slidably mounted upon said first mentioned handle, said lid or cover being provided with a plurality of depending lugs bent inwardly so as to slidably fit under the top edge of the basket or receptacle.

17. A device of the character described including, in combination, a basket or receptacle of foraminous material having a handle secured thereto, a one piece pan member shaped to correspond with the bottom of said basket or receptacle and insertible therein and removable therefrom, and having means for engaging the foraminous material so as to hold the pan member in position in said basket or receptacle, and a lid or cover for said basket or receptacle having a handle slidably mounted upon said first mentioned handle, said handle for the lid or cover being formed of wire and being bent so as to frictionally engage said first mentioned handle and also so as to cause said lid or cover to frictionally engage the top edges of said basket or receptacle.

18. A device of the character described, including, in combination, a basket or receptacle having a handle member extending therefrom, a lid or cover for said basket or receptacle and having another handle member extending therefrom, said handle members being closely associated together and having means for holding them in slidable frictional engagement, the second-mentioned handle member being bent near its junction with the lid or cover so as to cause said lid or cover to tightly fit against the upper edge of the receptacle.

19. A device of the character described, including, in combination, a basket or receptacle having a handle member extending therefrom, a lid or cover for said basket or receptacle and having another handle member extending therefrom, said handle members being closely associated together and having means for holding them in slidable frictional engagement, said handle members each being formed of a pair of wire members, a loop clamping member engaging the wire members of the first-mentioned handle member, said second-mentioned handle member being bent near its junction with the lid or cover so as to cause said lid or cover to tightly fit the top edge of the receptacle and cause one edge of the lid or cover to bear against said clamping loop member during its movement to and from open and closed positions.

In testimony that I claim the foregoing, I have hereunto set my hand this 21st day of April, 1928.

JOHN L. BENNETT.